(12) United States Patent
Beckman et al.

(10) Patent No.: US 9,877,607 B2
(45) Date of Patent: Jan. 30, 2018

(54) INTEGRATED BEVERAGE INFUSER LID

(71) Applicant: Pacific Market International, LLC, Seattle, WA (US)

(72) Inventors: Michael Beckman, Seattle, WA (US); Kimberly Lambert, Seattle, WA (US)

(73) Assignee: Pacific Market International, LLC, Seattle, WA (US)

( * ) Notice: Subject to any disclaimer, the term of this patent is extended or adjusted under 35 U.S.C. 154(b) by 334 days.

(21) Appl. No.: 14/657,984

(22) Filed: Mar. 13, 2015

(65) Prior Publication Data

US 2016/0262565 A1 Sep. 15, 2016

(51) Int. Cl.
*A47J 31/06* (2006.01)
*A47J 31/00* (2006.01)
*A47J 31/20* (2006.01)

(52) U.S. Cl.
CPC ......... *A47J 31/0636* (2013.01); *A47J 31/005* (2013.01); *A47J 31/20* (2013.01)

(58) Field of Classification Search
CPC ....... A47J 31/0636; A47J 31/20; A47J 31/005
See application file for complete search history.

(56) References Cited

U.S. PATENT DOCUMENTS

| | | | | |
|---|---|---|---|---|
| 1,590,968 A | * | 6/1926 | Forman | A47G 19/16 99/319 |
| 1,668,329 A | * | 5/1928 | Miller | A47G 19/16 100/123 |
| 1,672,518 A | * | 6/1928 | Ensko | B65D 85/812 40/324 |
| 1,702,243 A | * | 2/1929 | Axtell | A47G 19/14 99/295 |
| 1,785,878 A | * | 12/1930 | Schachter | A47G 19/16 99/295 |
| 2,099,996 A | * | 11/1937 | Beling | A47G 19/16 99/318 |
| 2,753,051 A | * | 7/1956 | Tupper | B65D 47/148 210/239 |
| 3,187,964 A | * | 6/1965 | Foster | B65D 47/0833 220/254.3 |

(Continued)

FOREIGN PATENT DOCUMENTS

WO 2007030533 A1 3/2007

*Primary Examiner* — Sean Michalski
(74) *Attorney, Agent, or Firm* — George C. Rondeau, Jr.; Davis Wright Tremaine LLP

(57) ABSTRACT

An integrated beverage infuser and lid are adapted for use with a drinking vessel for brewing a consumable product, such as tea, in the drinking vessel, such as a travel mug or insulated tumbler. The lid includes a main body adapted for removable attachment to the drinking vessel. A fluid-permeable brewing basket defines an enclosable receptacle for removable receipt of the brewing product. The basket is movable between a stowed position, close to a lower surface of the main body and above the level of liquid in the drinking vessel, and a deployed position, spaced farther apart from the lower surface of the main body for submersion in the liquid contained in the drinking vessel. A flexible attachment member attaches the brewing basket to the lid main body. A sidewall recess in the main body retains the flexible attachment member when the brewing basket is in the stowed position.

31 Claims, 15 Drawing Sheets

(56) References Cited

U.S. PATENT DOCUMENTS

| | | | | |
|---|---|---|---|---|
| 3,517,604 | A * | 6/1970 | Coors | A47G 19/14 99/323 |
| 4,503,991 | A * | 3/1985 | Joyce | B65D 47/0847 16/225 |
| D278,312 | S * | 4/1985 | Cleevely | B65D 47/0847 D9/449 |
| 4,754,898 | A * | 7/1988 | Britt | B65D 47/0842 220/255 |
| 4,785,723 | A * | 11/1988 | Sheen | A47G 19/14 99/279 |
| D315,872 | S * | 4/1991 | Bixler | B65D 47/0847 D9/435 |
| 5,110,002 | A * | 5/1992 | Tucker | B65D 43/0212 220/254.3 |
| 5,244,113 | A * | 9/1993 | Stymiest | B65D 47/0885 215/228 |
| 5,415,312 | A * | 5/1995 | Mueller | B65D 47/089 220/254.3 |
| D425,362 | S * | 5/2000 | Meyers | B65D 47/0847 D7/392 |
| 6,314,866 | B1 * | 11/2001 | Melton | A47G 19/16 426/433 |
| 6,419,101 | B1 | 7/2002 | Hessel et al. | |
| 6,460,725 | B1 * | 10/2002 | Portman | B65D 43/0218 215/387 |
| 6,783,019 | B2 * | 8/2004 | Zettle | B65D 43/0212 220/254.3 |
| 6,978,910 | B2 * | 12/2005 | Sanders | B65D 45/20 220/326 |
| 7,121,438 | B2 * | 10/2006 | Hoepner | B65D 47/0895 220/254.2 |
| 7,140,510 | B2 * | 11/2006 | Portman | A47G 19/22 215/387 |
| 7,954,659 | B2 * | 6/2011 | Zuares | B65D 47/0804 220/254.3 |
| 8,205,542 | B2 | 6/2012 | Gilbert | |
| D686,453 | S * | 7/2013 | Smiedt | B65D 47/0847 D7/510 |
| 8,590,730 | B2 * | 11/2013 | Buck | B65D 21/0237 220/23.83 |
| 8,857,644 | B2 * | 10/2014 | Phillips | B65D 7/40 220/247 |
| 2001/0042446 | A1 * | 11/2001 | Denny | A47J 31/50 99/323.3 |
| 2003/0052126 | A1 * | 3/2003 | Zettle | B65D 43/0212 220/254.3 |
| 2003/0089714 | A1 * | 5/2003 | Dart | B65D 43/0212 220/254.3 |
| 2006/0124628 | A1 * | 6/2006 | Long | A47J 31/20 219/438 |
| 2008/0060526 | A1 * | 3/2008 | Gilbert | A47J 31/20 99/289 D |
| 2009/0056556 | A1 * | 3/2009 | Lin | A47G 19/2272 99/289 R |
| 2010/0154650 | A1 * | 6/2010 | Koschberg | A47J 31/0626 99/300 |
| 2014/0053736 | A1 * | 2/2014 | Simontov | A47J 31/20 99/323 |
| 2014/0291233 | A1 * | 10/2014 | Merinova | A47J 31/08 210/350 |
| 2015/0173554 | A1 * | 6/2015 | Talarico | A47J 31/20 426/435 |
| 2015/0272378 | A1 * | 10/2015 | Sands | A47J 31/42 426/433 |
| 2016/0120355 | A1 * | 5/2016 | Shen | A47J 31/0636 99/322 |
| 2016/0130045 | A1 * | 5/2016 | Giraud | B65D 43/162 53/492 |
| 2016/0270581 | A1 * | 9/2016 | Sealy | A47J 31/20 |
| 2016/0296058 | A1 * | 10/2016 | Hauser | A47G 19/16 |
| 2017/0065942 | A1 * | 3/2017 | Dayton | B01F 7/00325 |
| 2017/0095107 | A1 * | 4/2017 | Chen | A47J 31/005 |
| 2017/0107023 | A1 * | 4/2017 | Miksovsky | B65D 47/122 |

* cited by examiner

INTEGRATED BEVERAGE INFUSER LID

TECHNICAL FIELD

The invention relates to removable lids for beverage containers. Specifically, the invention relates to lids having a means for brewing tea, coffee or other consumable products in a drinking vessel.

BACKGROUND

The following description includes information that may be useful in understanding the present invention. It is not an admission that any of the information provided herein is prior art or relevant to the presently claimed invention, or that any publication specifically or implicitly referenced is prior art.

U.S. Pat. No. 8,205,542 discloses an integrated beverage infuser lid having a fluid-permeable brewing basket for brewing a consumable product in a beverage container.

DETAILED DESCRIPTION

Figure 1:
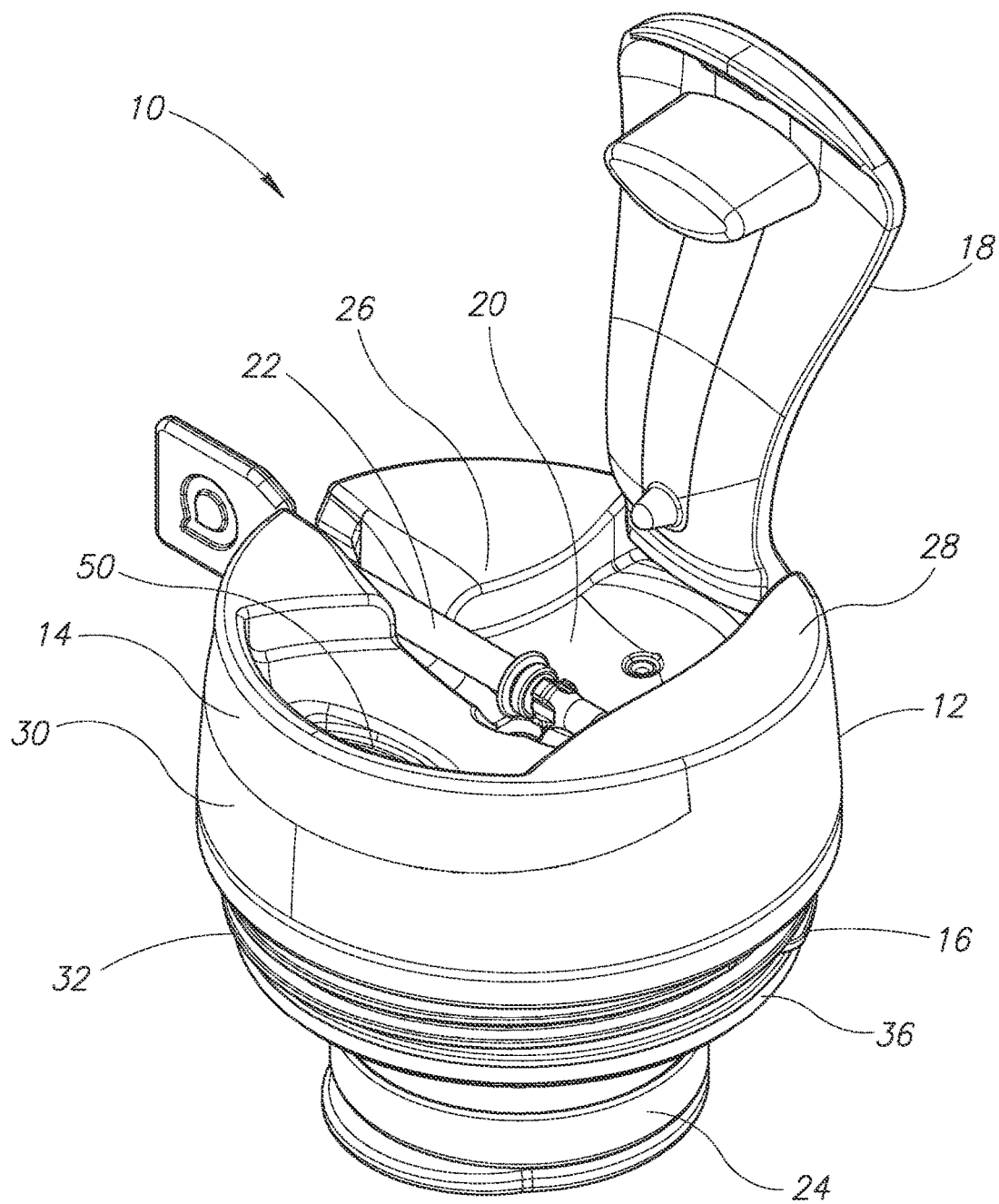
FIG. 1 illustrates a top perspective view of an integrated beverage infuser and lid.
Figure 11:
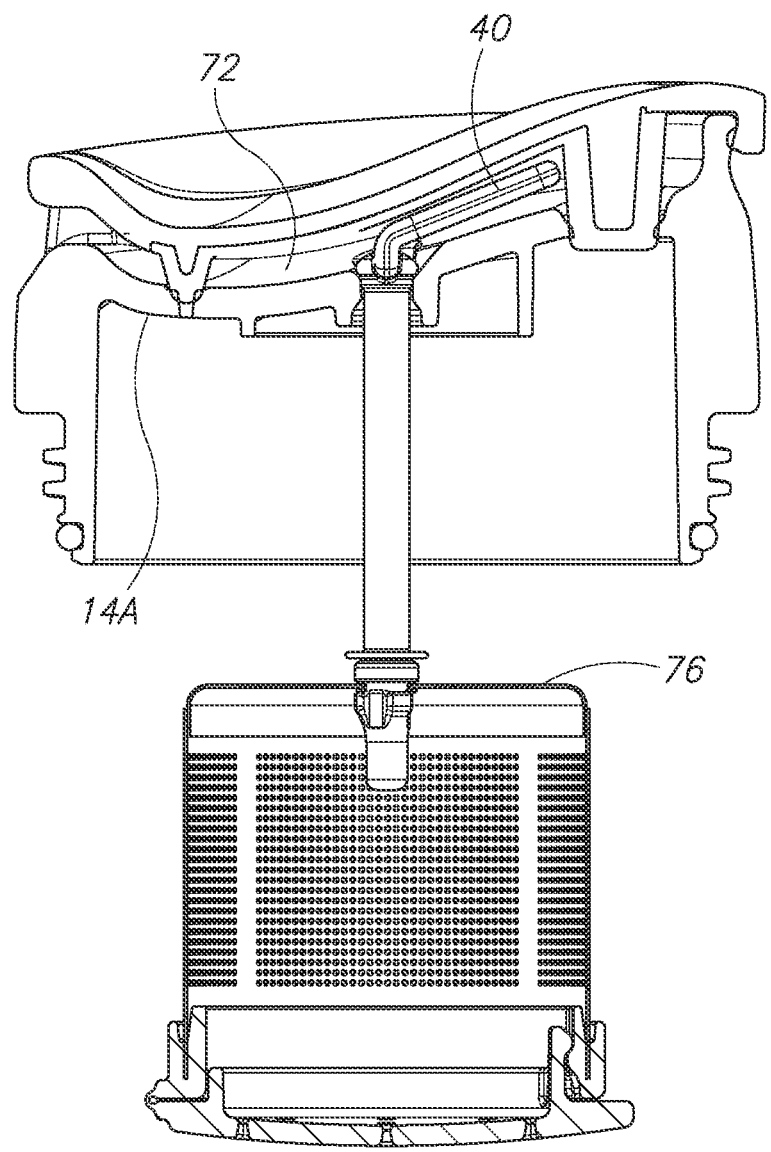
FIG. 11 illustrates a cross-sectional left side view of the beverage infuser and lid of FIG. 1 showing the brewing basket in the deployed position with the cover closed.
Figure 12:
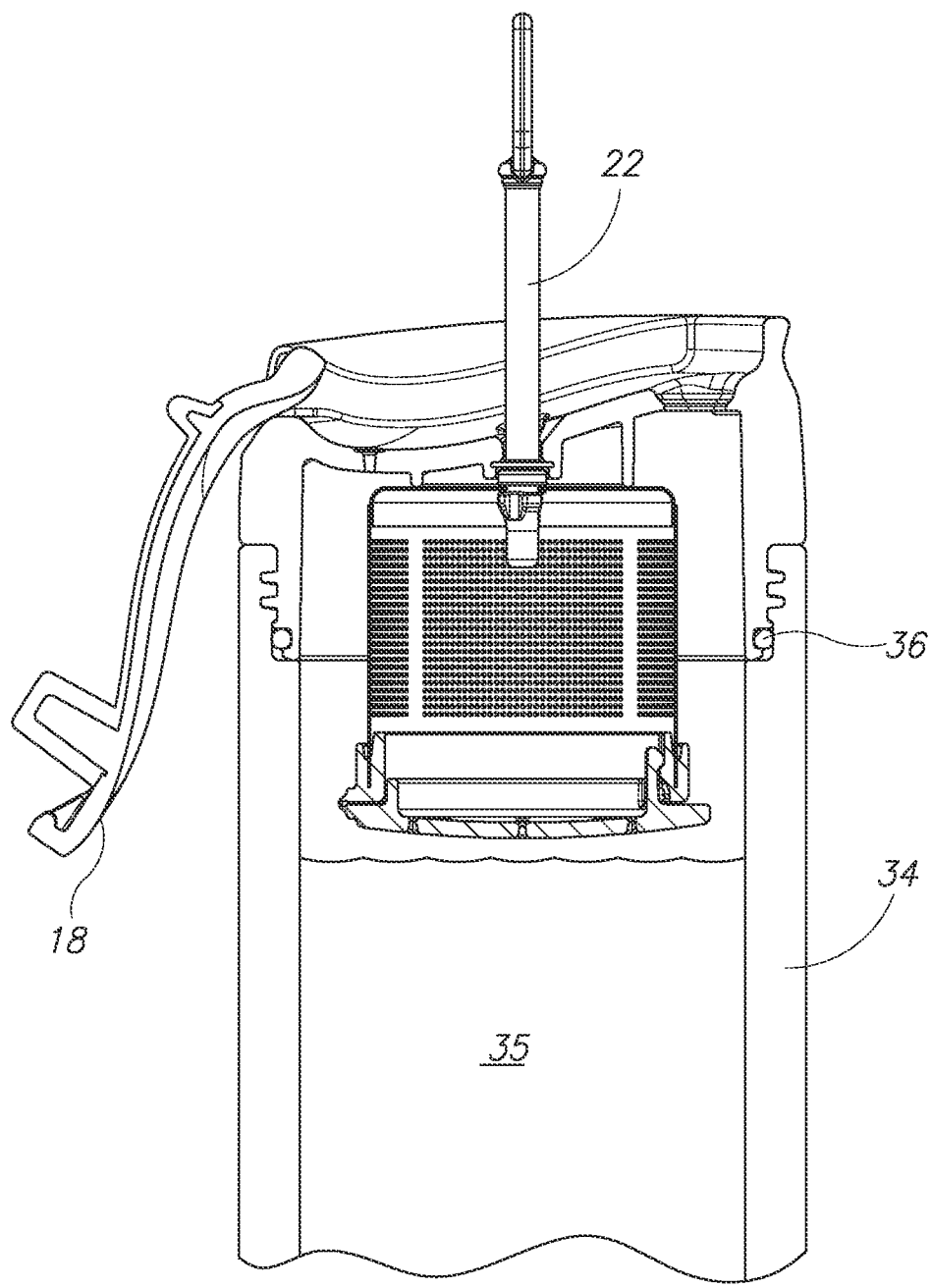
FIG. 12 illustrates a cross-sectional left side view of the integrated beverage infuser and lid of FIG. 1 showing the brewing basket in the stowed position and the lid attached to a drinking vessel with the cover fully open.
Figure 13:
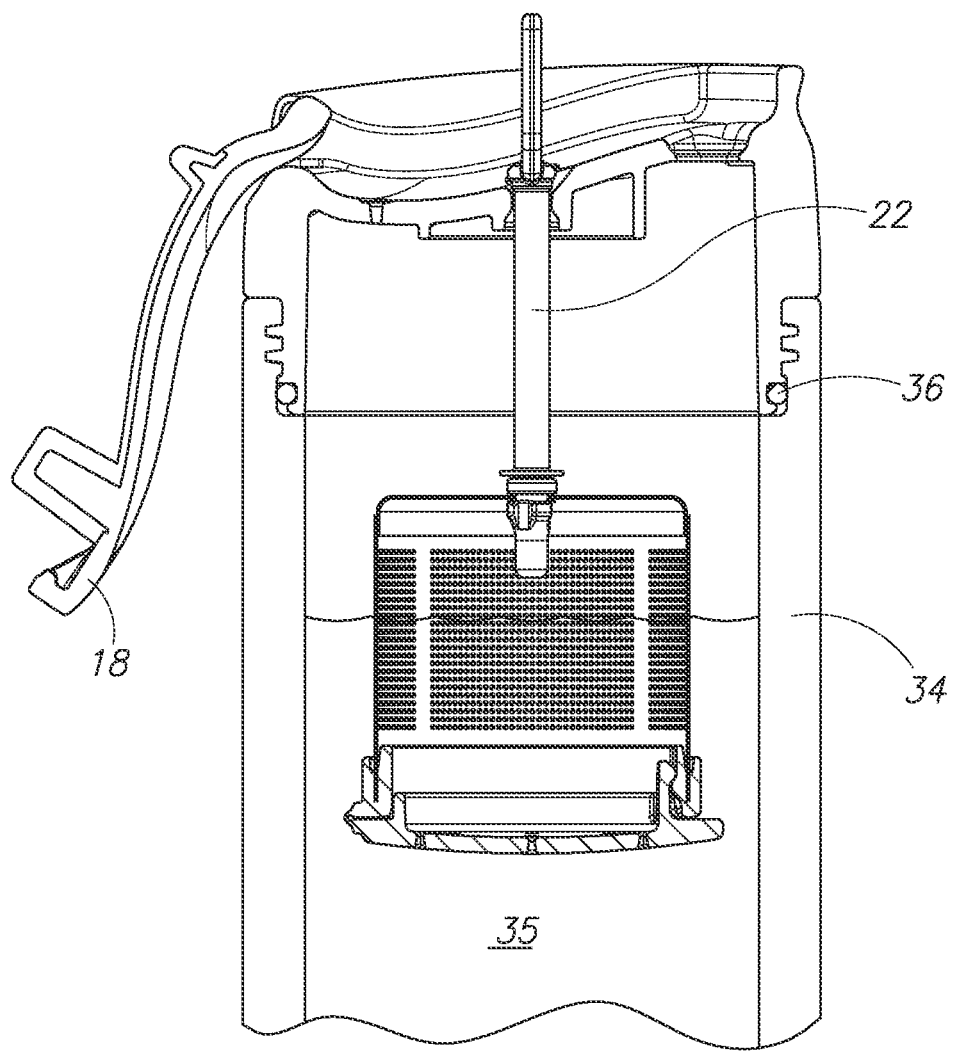
FIG. 13 illustrates a cross-sectional left side view of the integrated beverage infuser and lid of FIG. 1 showing the brewing basket in the deployed position and the lid attached to the drinking vessel with the cover fully open.

An integrated beverage infuser lid 10 for a drinking vessel is shown in FIG. 1. The lid has a substantially cylindrical main body 12 with an upper portion 14 and a lower portion 16. A cover 18 is pivotally attached to the upper portion 14 of the lid 10 and can be closed to fit into a first elongated recess 20 of the upper portion 14. A flexible attachment member 22 is attached to a brewing basket 24 suspended within lower portion 16 of the lid 10. The flexible attachment member 22 facilitates transitioning the brewing basket 24 between a stowed position (shown in FIGS. 1, 6, 7 and 12) and a deployed position (shown in FIGS. 10, 11 and 13), as described in greater detail below. The upper surfaces of the upper portion 14 and cover 18 define a depression with a central portion 26 lower than a peripheral portion 28. The cover 18 is pivotally attached to the upper portion 14 to rotate about a horizontal axis of rotation located at a rearward portion of the peripheral portion 28 of the upper portion 14. Although not illustrated, the cover 18 may be instead attached at an axis of rotation inward from the peripheral portion 28. In FIG. 1, an exterior surface 30 of the lower portion 16 of the lid 10 has threads 32 such that the lid can threadably attach to a drinking vessel 34, as shown in FIGS. 12 and 13. Other attachment means may be used to removably join the lid to the drinking vessel in a fluid-tight configuration, such as a bayonet mount, and may include an O-ring 36 or gasket sized to seal the lid 10 to the drinking vessel 34.

Figure 2:
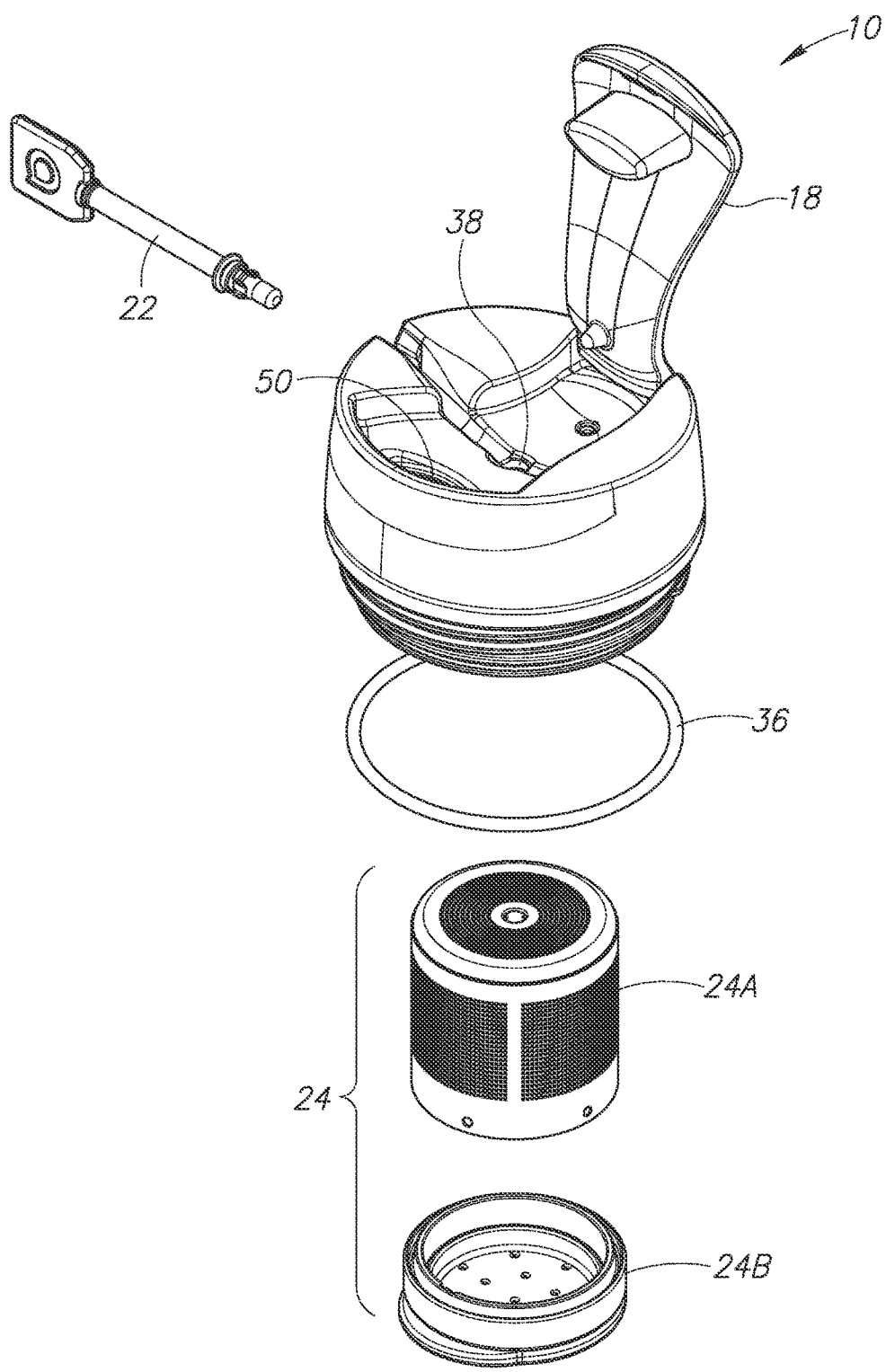
FIG. 2 illustrates an exploded view of the beverage infuser and lid of FIG. 1.

An exploded view of the lid 10 is shown in FIG. 2. An attachment aperture 38 is provided in the first elongated recess 20. The attachment member 22 extends through the attachment aperture 38, as shown in FIGS. 6-11, to attach the brewing basket 24 to the lid 10. The brewing basket 24 has a substantially cylindrical shape and a space therein in which tea, coffee, or other brewing product may be placed. The brewing basket 24 has a basket upper portion 24A and a basket lower portion 24B.

Figure 3A:
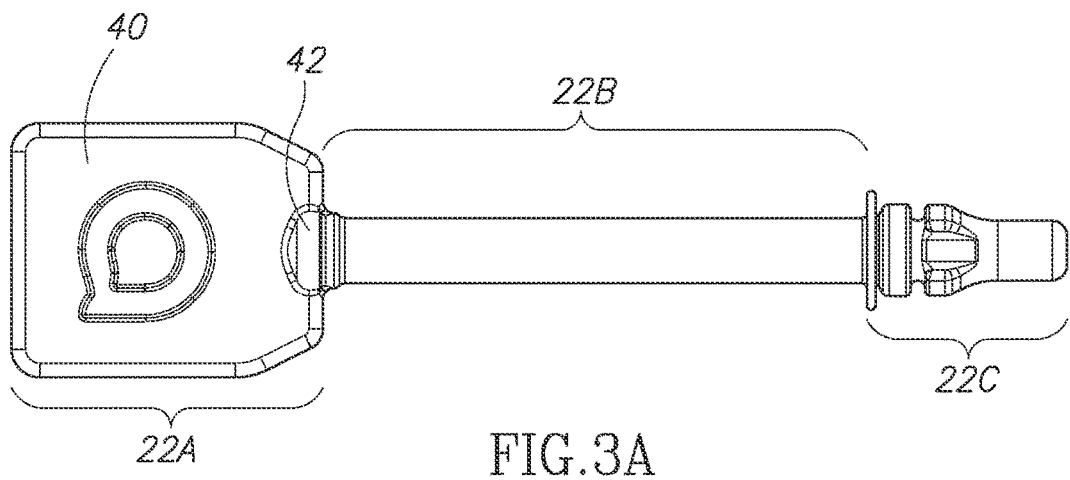
FIG. 3A illustrates a plan view of an attachment member used with the beverage infuser and lid of FIG. 1.
Figure 3B:
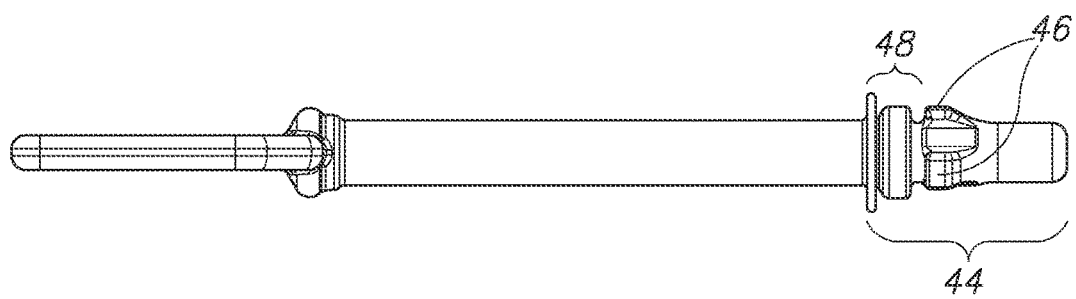
FIG. 3B illustrates a side view of the attachment member of FIG. 3A.

The flexible attachment member 22 shown in FIG. 3A has an upper end portion 22A, a middle portion 22B, and a lower end portion 22C. The middle portion 22B is sized to fit into and slide back and forth through the attachment aperture 38. Although the middle portion 22B is cylindrical in this embodiment, the middle portion 22B may instead have a different shape, such as a rectangular cross-section, by way of non-limiting example. The upper end portion 22A has a gripping tab 40 sized to allow the user to grip the gripping tab 40 and move the middle portion 22B back and forth through the attachment aperture 38. The gripping tab 40 is thin in a thickness direction, as seen in FIG. 3B.

An insertion section 44 is located on the lower end portion 22C of the attachment member 22. The insertion section 44 has several retention tabs 46 which insert into the brewing basket 24 and retain the attachment member 22 to the brewing basket 24. The retention tabs 46 are tapered toward the free end of the lower end portion 22C to allow insertion of the lower end portion 22C into the brewing basket 24, and prevent removal therefrom once inserted, as shown in FIGS. 6, 7, 10 and 11.

Figure 6:
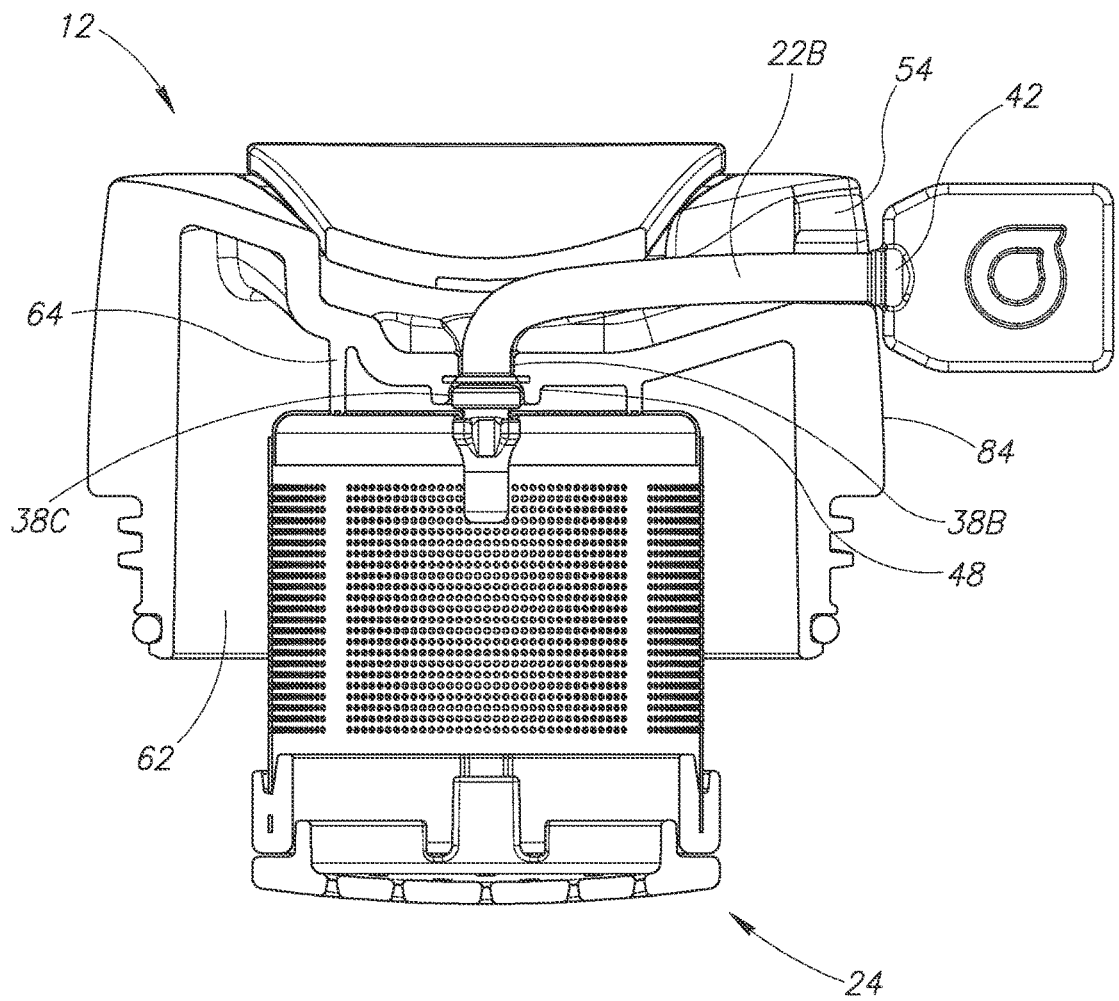
FIG. 6 illustrates a cross-sectional rear view of the beverage infuser and lid of FIG. 1 showing the brewing basket in a stowed position with the cover closed.
Figure 7:
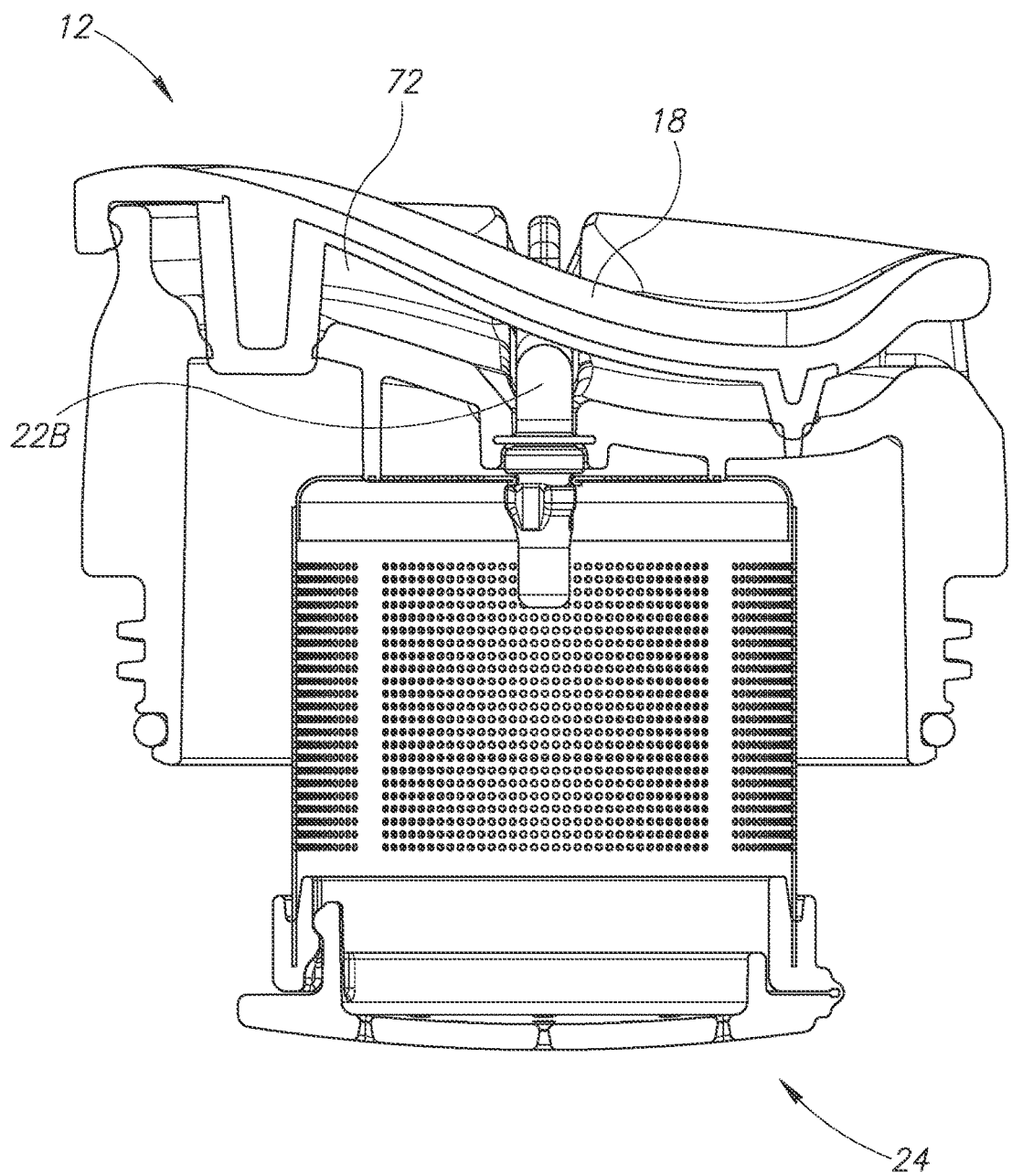
FIG. 7 illustrates a cross-sectional right side view of the beverage infuser and lid of FIG. 1 showing the brewing basket in the stowed position with the cover closed.
Figure 10:
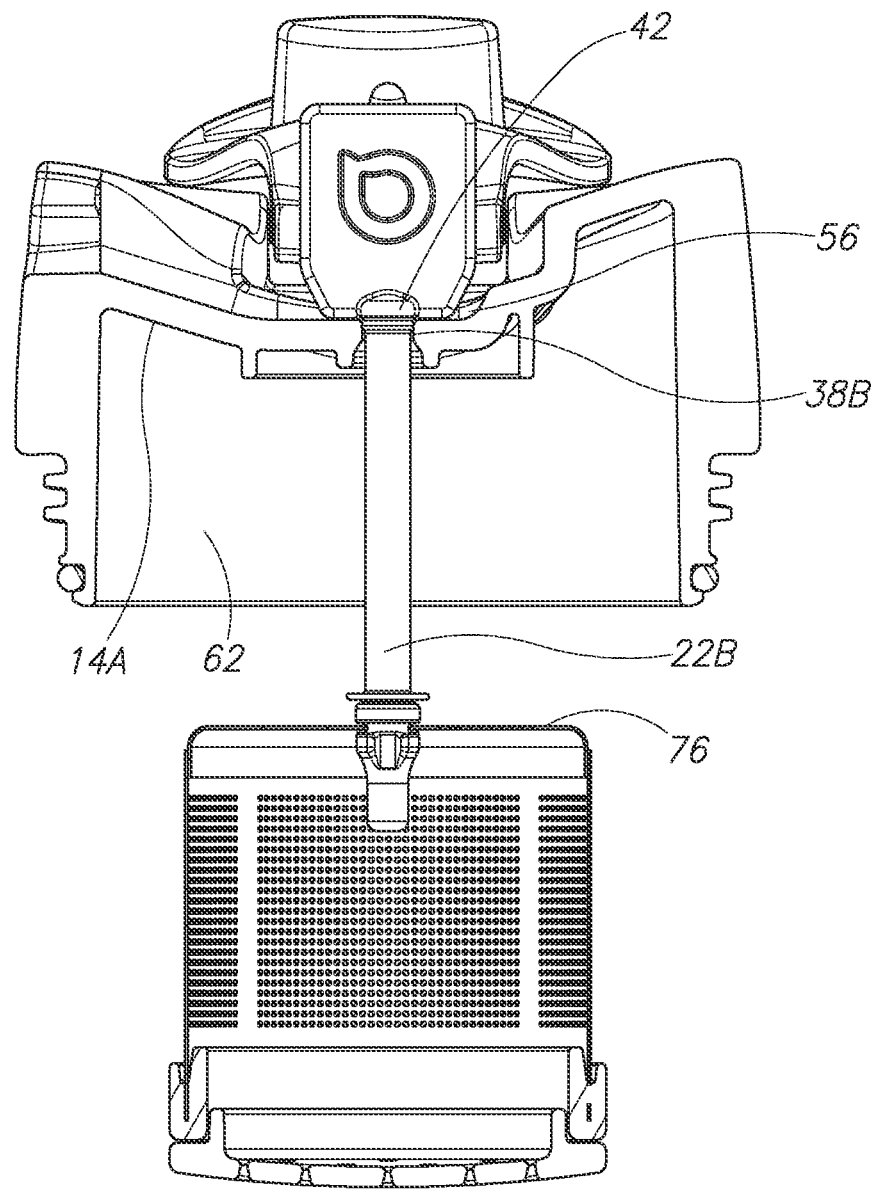
FIG. 10 illustrates a cross-sectional front view of the beverage infuser and lid of FIG. 1 showing the brewing basket in a deployed position with the cover open.

A first base portion 42 is located between the gripping tab 40 and the middle portion 22B. The first base portion 42 is wider than the middle portion 22B and the attachment aperture 38, as shown in FIGS. 10 and 11. A second base portion 48 is disposed between the middle portion 22B and the insertion section 44. The second base portion 48 is wider than the middle portion 22B and the attachment aperture 38, as shown in FIGS. 6 and 7. Once the attachment member 22 is inserted into the brewing basket 24, the brewing basket 24 is secured between the retention tabs 46 and the second base portion, as seen in FIGS. 6, 7, 10 and 11.

Figure 4A:
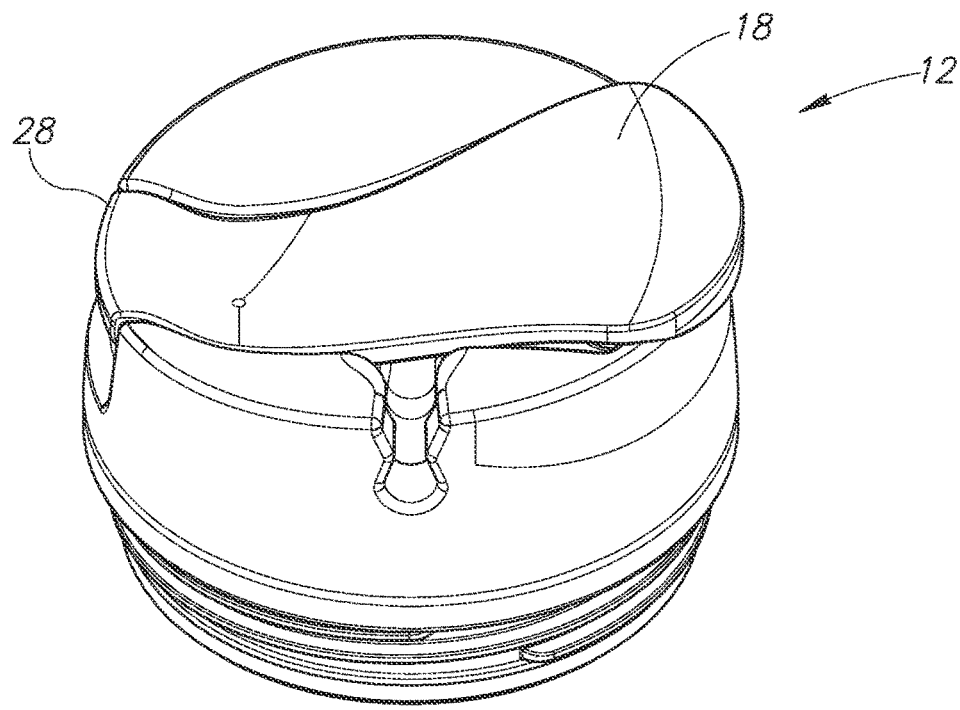
FIG. 4A illustrates a top perspective view of the beverage infuser and lid of FIG. 1 showing a lid main body with a closed cover.
Figure 4B:
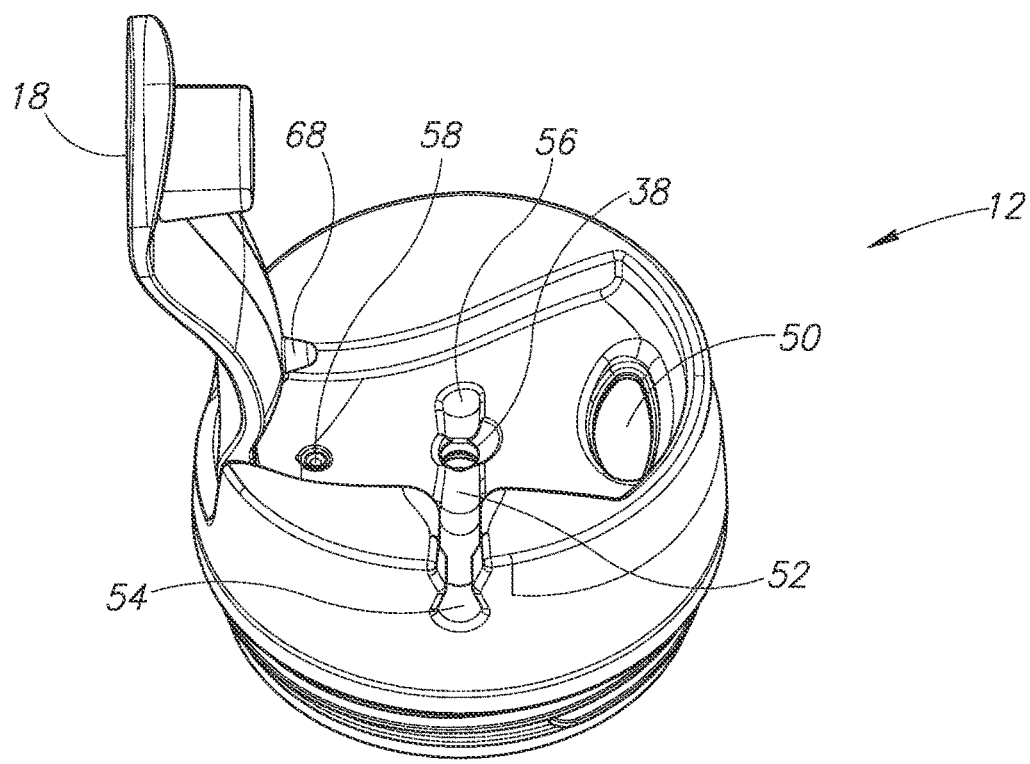
FIG. 4B illustrates a top perspective view of the beverage infuser and lid of FIG. 1 showing the lid main body with an open cover.

The cover 18 is selectively rotatable about the axis of rotation between a closed position where a drinking aperture is sealed, as shown in FIG. 4A, and an open position where a user may consume liquid from the drinking aperture, as shown in FIG. 4B with smooth liquid flow facilitated by a venting aperture 58. The cover 18 is shaped to cover and fit within the first elongated recess 20. As shown, a rearward end portion of the cover 18 is positioned within and pivotally attached to opposing sidewalls of the first elongated recess 20 at the peripheral portion 28. Alternatively, the cover 18 may instead be attached to the upper portion 14 at a location outside of the first elongated recess 20.

The drinking aperture 50, venting aperture 58 and attachment aperture 38 are disposed in the first elongated recess 20, as shown in FIG. 4B. If the first elongated recess 20 extended over a smaller area of the upper portion 14, the attachment aperture 38 could be located outside of the first elongated recess 20 near the central portion 26, by way of non-limiting example.

An upwardly open second elongated recess 52 extends from the attachment aperture 38 toward the peripheral portion 28. The second elongated recess 52 terminates with an upwardly and outwardly open sidewall recess 54. The middle portion 22B of the flexible attachment member 22 may be positioned in the second elongated recess 52 when the brewing basket 24 is in the stowed position (see FIGS. 8 and 9). The second elongated recess 52 has a width such that when a lengthwise portion of the middle portion 22B is within the second elongated recess the sidewalls thereof grip the middle portion and retain it against movement under the weight of the brewing basket 24 suspended from the lower end portion 22C of the flexible attachment member when the brewing basket is in the stowed position. The user may press fit the middle portion 22B into the second elongated recess 52 by positioning it above the second elongated recess and pressing it downward using a finger to apply a downward force of the middle portion. The second elongated recess 52 may have an extended portion 56 that extends past the attachment aperture 38 in a direction opposite to the sidewall recess 54.

The venting aperture 58 disposed in the first elongated recess 20 equalizes the pressure within the drinking vessel 34 with ambient pressure outside of the drinking vessel 34 when liquid passes through the drinking aperture 50. The venting aperture 58 may alternatively be disposed on an upper surface of the upper portion 14 outside of the first elongated recess 20, or eliminated completely.

Figure 4C:
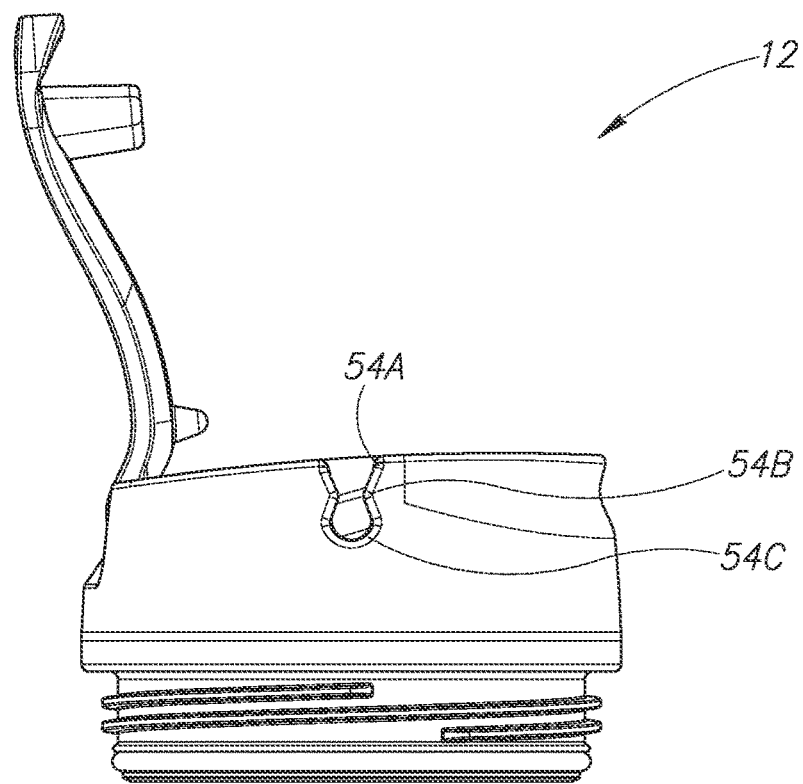
FIG. 4C illustrates a left side view of the beverage infuser and lid of FIG. 1 showing the lid main body with an open cover.

The sidewall recess 54 has an upwardly open opening 54A, as shown in FIG. 4C. The opening 54A is wider than the portion of the middle portion 22B to be fit within the sidewall recess 50 when the brewing basket 24 is in the stowed position. The opening 54A tapers downwardly to a narrow portion 54B that is narrower than the portion of the middle portion 22B to be fit within the sidewall recess 50. The sidewall recess 54 terminates at a retaining portion 54C below the narrow portion 54B that is approximately the same width as the middle portion 22B but preferably grips the middle portion 22B with sufficient force to retain it against movement under the weight of the brewing basket 24.

Figure 4D:
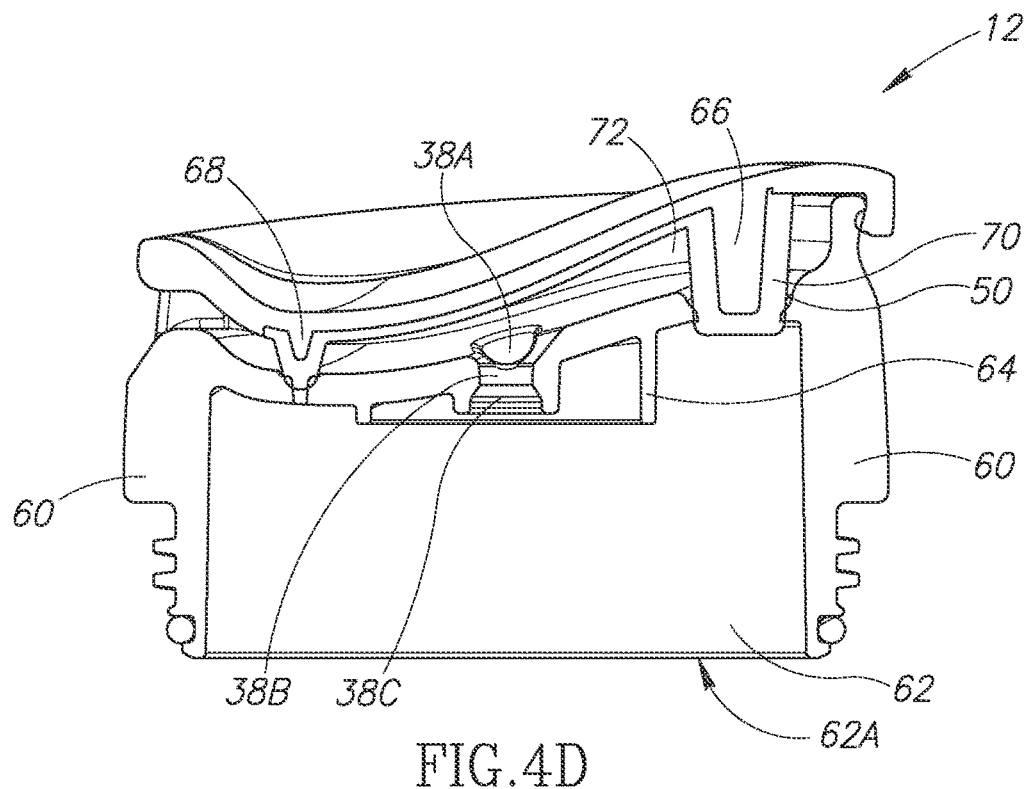
FIG. 4D illustrates a cross-sectional left side view of the beverage infuser and lid of FIG. 1 showing the lid main body with an open cover.

The lower portion 16 of the main body 12 of the lid 10 includes a circumferentially extending sidewalls 60 extending downward from the upper portion 14, and forming a downwardly opening cavity 62 having a lower open end 62A, as shown in FIG. 4D. An annular abutment wall 64 extends downward from the lower surface of the upper portion 14 and extends about the attachment aperture 38. When the brewing basket 24 is moved upward fully into the stowed position, and upper end wall 76 of the brewing basket engages the annular abutment wall 64 which assists in orienting and holding the brewing basket 24 in a vertical direction when the brewing basket is in the fully stowed position.

The cover 18 has a drinking stopper 66 and a vent stopper 68 which seal the drinking aperture 50 and the venting aperture 58, respectively, when the cover is in the closed position. A compressible portion 70 of the cover 18 covers the drinking stopper 66 and the vent stopper 68. The compressible portion 70 assists in forming a fluid-tight seal of the drinking aperture 50 and the venting aperture 58 when the cover 18 is in the closed position. When the cover 18 is in the closed position, an enclosed space 72 is defined between a lower surface of the cover 18 and an upper surface of the first elongated recess 20.

The attachment aperture 38 has an upper cavity 38A, a middle opening 38B, and a lower cavity 38C, as shown in FIG. 4D. The upper cavity 38A and/or lower cavity 38C may be tapered toward the middle opening 38B. The middle opening 38B is approximately the same width as the middle portion 22B of the flexible attachment member or slightly larger, as shown in FIGS. 6, 7, 10 and 11, to allow easy movement of the flexible attachment member therethrough when moving the brewing basket 24 between the stowed and deployed positions. Although the attachment aperture 38 is substantially cylindrical in this embodiment, the attachment aperture may instead have a different shape to match the cross-sectional shape of the attachment member 22. By way of non-limiting example, the attachment aperture 38 may instead be a thin rectangular-shaped slot into which an attachment member 22 having a rectangular cross-section may fit.

Figure 5A:
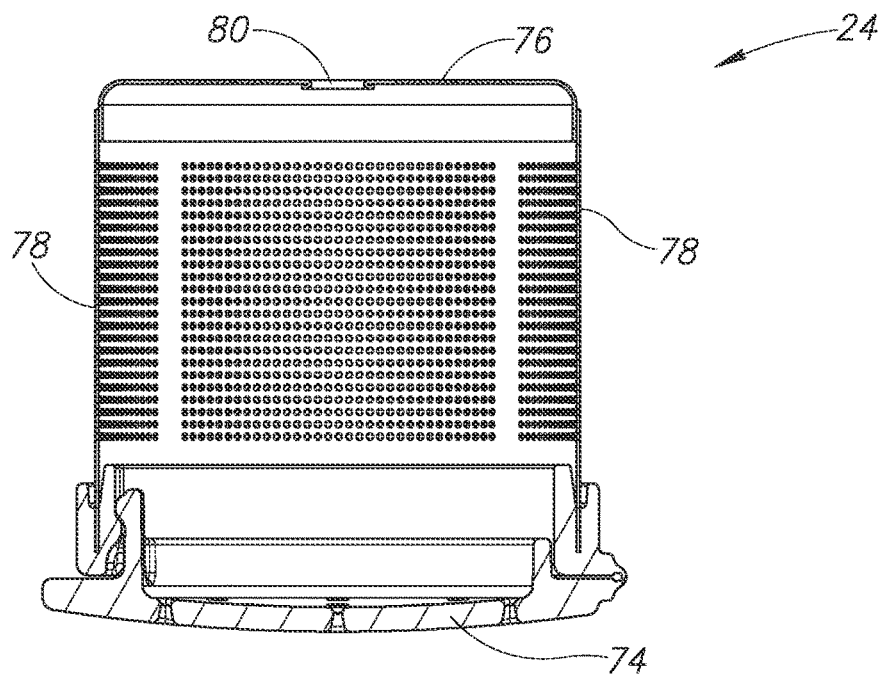
FIG. 5A illustrates a cross-sectional side view of a brewing basket used with the beverage infuser and lid of FIG. 1.

Referring to FIG. 5A, the lower portion 24B of the brewing basket 24 has a lower end wall 74. The lower end wall 74 forms a door at a lower end opening 24C of the brewing basket which opens to expose the space inside the brewing basket 24 and allows for insertion and removal of the brewing product, as shown in FIG. 5C. The upper portion 24A of the brewing basket has the upper end wall 76 to which the flexible attachment member 22 is attached and a basket sidewall 78. The basket sidewall 78 connects the lower end wall 74 and the upper end wall 76. Holes on the lower end wall 74, the upper end wall 76 and/or the basket sidewall 78 allow liquid to permeate the brewing basket 24 to contact the brewing product therein.

Figure 5B:
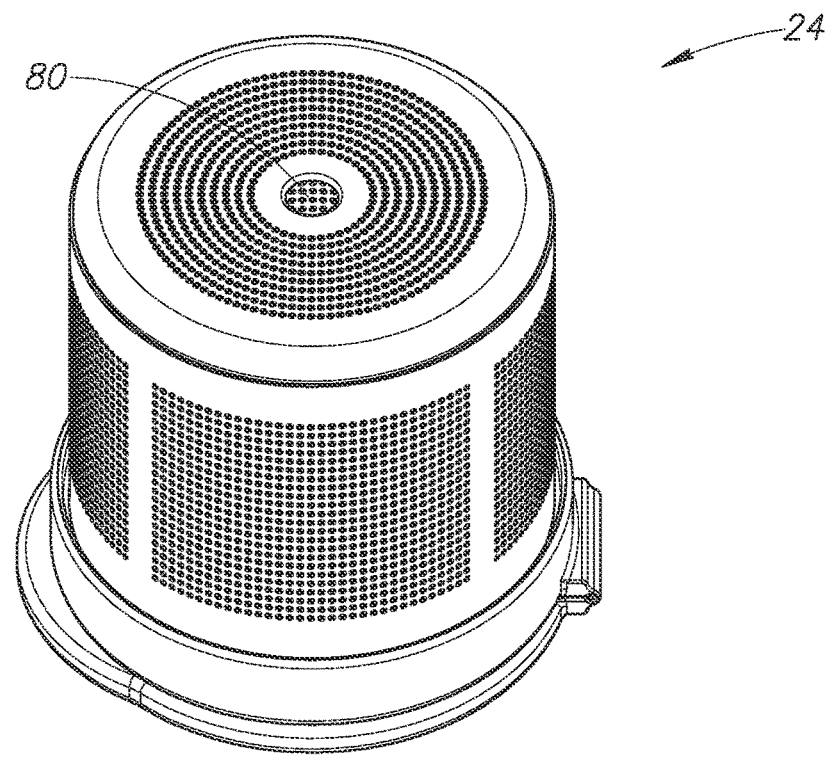
FIG. 5B illustrates a top perspective view of the brewing basket of FIG. 5A.
Figure 5C:
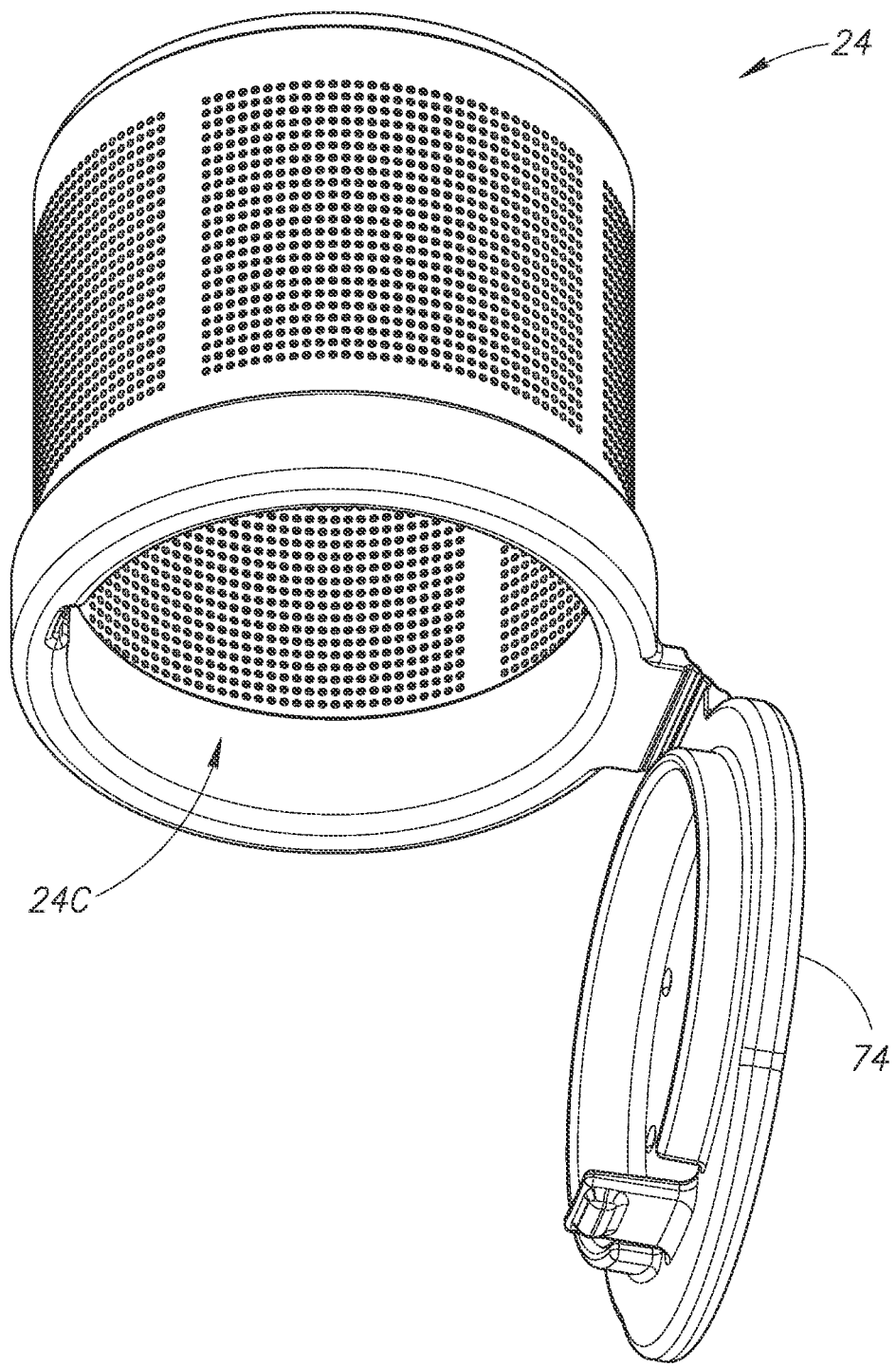
FIG. 5C illustrates a bottom perspective view of the brewing basket of FIG. 5A.

A basket attachment aperture 80 is located on the upper end wall 76, as shown in FIG. 5B. The insertion portion 44 of the flexible attachment member 22 may be inserted in the basket attachment aperture 80 thereby attaching the brewing basket 24 to the flexible attachment member. The holes on the upper end wall 76 are concentrically arranged around the basket attachment aperture 80. Although the brewing basket 24 is cylindrical as illustrated, the brewing basket 24 may be any volumetric shape that facilitates enclosing a brewing product therein to expose the brewing product to liquid in the drinking vessel to which the lid 10 is attached. Such volumetric shapes include a spherical shape, a box shape, or a prism shape, by way of non-limiting example.

FIG. 6 illustrates the brewing basket 24 in the stowed position. In the stowed position, the upper end wall 76 is proximate to a lower surface 14A of the upper portion 14 and in engagement with a lower edge of the annular abutment wall 64. In this position, the second base portion 48 of the flexible attachment member 22 is positioned adjacent to the lower surface 14A of the upper portion 14. To transition the brewing basket 24 from the deployed position to the stowed position, the user pulls the gripping tab 40 generally upward away from the attachment aperture 38 until the brewing basket reaches the stowed position. The middle portion 22B of the attachment member 22 is shorter than the second elongated recess 52. As a result, the user must somewhat stretch and bend the flexible attachment member 22 to insert the middle portion 22B into the second elongated recess 52 and within the retaining portion 54C of the sidewall recess 54 with the first base portion 42 of the flexible attachment member laterally outward of the sidewall recess 54. This stretching action causes the second base portion 48 to move more fully into a lower cavity 38C in the lower surface 14A of the upper portion 14, whereat it covers any gap between the wall of the attachment aperture 38 and the middle portion 22B of the flexible attachment member 22 at a location below the middle opening 38B of the attachment aperture 38, and helps prevent heat and liquid from escaping through the attachment aperture 38 when the brewing basket 24 is in the stowed position.

Figure 8:
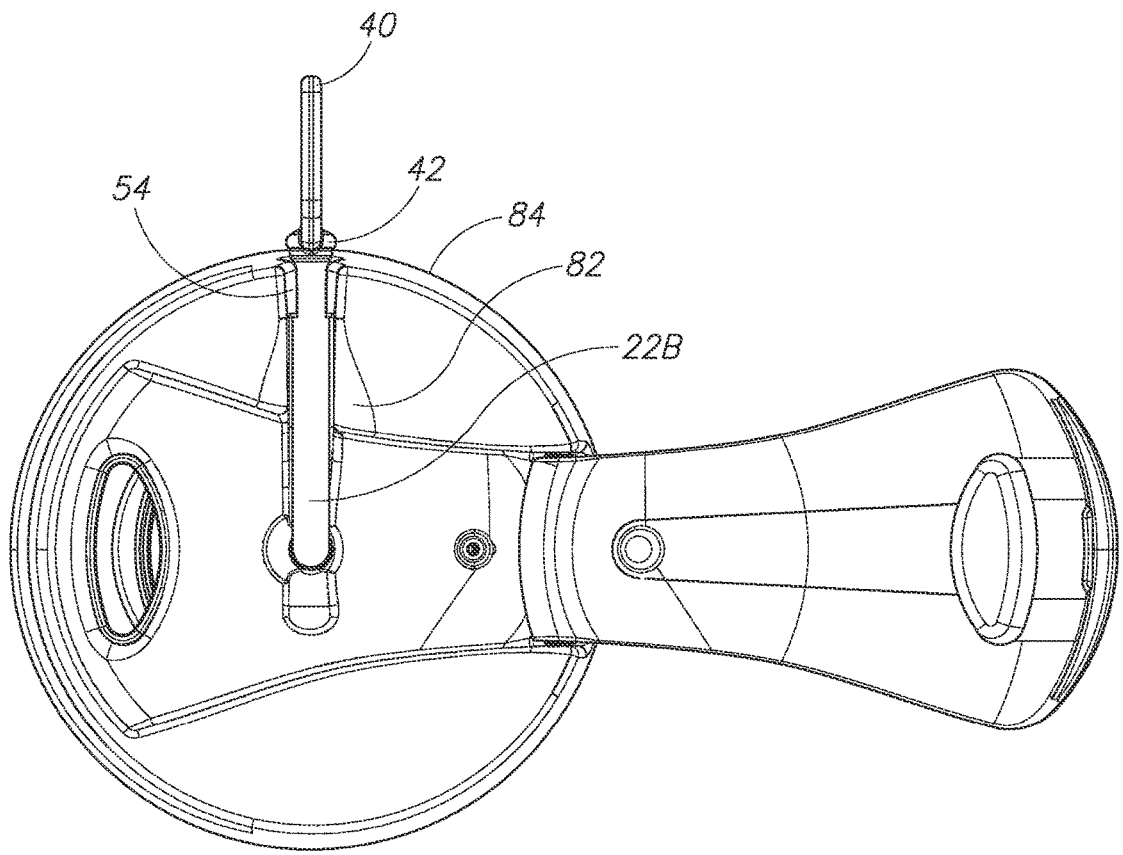
FIG. 8 illustrates top plan view of the beverage infuser and lid of FIG. 1 showing the brewing basket in the stowed position with the cover open.
Figure 9:
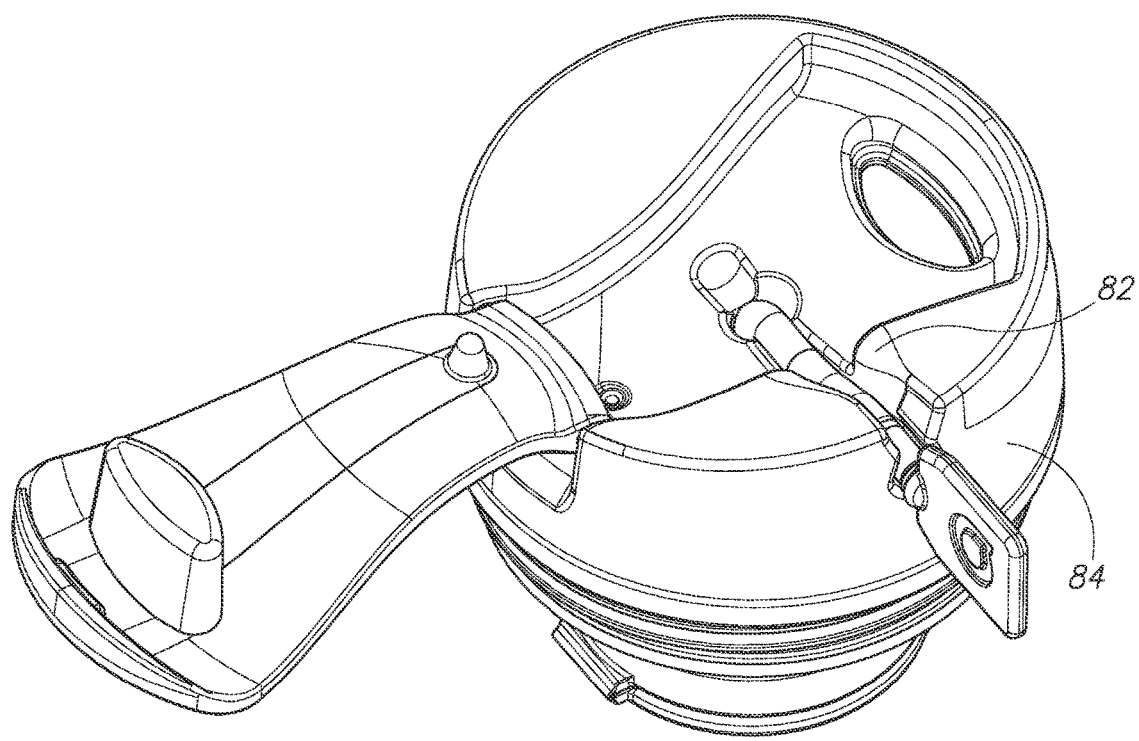
FIG. 9 illustrates a top perspective view of the beverage infuser and lid of FIG. 8.

The upper portion 14 includes an upwardly open and downwardly inward tapering tapered portions 82 which facilitates easy sliding of the middle portion 22B of the flexible attachment member 22 into the second elongated recess 52, as shown in FIGS. 8 and 9. The middle portion 22B may be retained by the sidewall recess 54 when the brewing basket 24 is in the stowed position and the attachment member 22 is in the stretched state. Secure retention is assisted by the first base portion 42 of the flexible attachment member 22 having a larger size than the retaining portion 54C of the sidewall recess 54 so it does not pull through the second elongated recess 52. Accordingly, the first base portion 42 may be retained on an exterior surface 84 of the upper portion 14 when the middle portion 22B is in the sidewall recess 54.

When the brewing basket 24 is in the stowed position, at least the upper end wall 76 of the brewing basket is disposed within the downwardly opening cavity 62 of the lower portion 16 of the main body 12 of the lid 10. The upper end wall 76 may contact lower end of the abutment wall 64 when the brewing basket 24 is in the stowed position, vertically orienting the brewing basket 24. In some embodiments the upper portion 14 of the lid 10 may not provide a downwardly opening cavity 62. As a non-limiting example of such a configuration, there may be no lower portion 16 below the upper portion 14, thus no downward extending sidewalls 60 extending downward from the upper portion, and attachment means for attachment of the lid to a drinking vessel (such as threads 32) may be disposed on a periphery of the upper portion 14. The brewing basket 24 could therefore still be in a stowed position even though it is not within a downwardly opening cavity 62. That is, the stowed position generally defines a position where the brewing basket 24 is close to the lower surface 14A of the upper portion 14 so that it is completely or at least mostly out of the liquid in the drinking vessel to which the lid 10 is attached. In the stowed position, the second base portion 48 of the flexible attachment member 22 may be in the lower cavity 38C of the attachment aperture 38 and seal the middle opening 38B.

The cover 18 may be closed over the flexible attachment member 22 when the brewing basket 24 is in the stowed position, as shown in FIG. 7. The cover 18 may therefore enclose the middle portion 22B of the flexible attachment member in the enclosed space 72 when the brewing basket 24 is in the stowed position.

FIG. 10 illustrates the brewing basket 24 in the deployed position. In the deployed position, the upper end wall 76 of the brewing basket is spaced apart from the lower surface 14A of the upper portion 14 sufficiently to be at least partially submersed in the liquid in the drinking vessel to which the lid 10 is attached, or at least further submersed than when in the stowed position. The first base portion 42 of the flexible attachment member 22 may fit into the upper cavity 38A of the attachment aperture 38 and cover the middle opening 38B of the attachment opening at a location above the middle opening to help retain heat within the drinking vessel while the beverage is brewing. When the gripping tab 40 is rotated to be in a plane aligned with the second elongated recess 52, a lower part of the gripping tab may be positioned within the second elongated recess 52 and also within the extended portion 56 which extends beyond the attachment aperture 38. The gripping tab 40 may be bent over and conveniently stored in the enclosed space 72 when the cover 18 is closed and the brewing basket 22 is in the deployed position, as shown in FIG. 11.

In FIG. 10, the upper end wall 76 of the brewing basket 24 is disposed below and outside of the downwardly opening cavity 62 of the lower portion 16 of the lid 10; however, this relationship does not necessarily define the deployed position. If the sidewall 60 does not extend downward from the upper portion 14, for example, the brewing basket 24 could be in a deployed position even though there is no downwardly opening cavity 62 in which the brewing basket 24 is moved when in the stowed position. Conversely, the sidewall 60 could be sized relative to the drinking vessel such that the brewing basket 24 could contact liquid when in the deployed position and still be fully or partially within the downwardly opening cavity 62. In other words, the brewing basket 24 may be considered to be in the deployed position when the upper end wall 76 is spaced apart from the lower surface 14A sufficiently to be at least partially submersed in the liquid in the drinking vessel to which the lid 10 is attached which is more than when in the stowed position.

In FIG. 12 the integrated beverage infuser lid 10 is shown attached to a drinking vessel 34 with the brewing basket 24 in the stowed position. The brewing basket 24 is positioned above the liquid in the drinking vessel 34 to prevent exposure of the brewing product to the liquid, either before the user wishes to commence the brewing process or after the brewing process is sufficiently complete for the user's taste so that brewing does not continue. The cover 18 is opened and may be rotated fully rearward to rest against the side of the drinking vessel 34. The shape of the cover 18 allows the cover 18 to reach rearward over and around the peripheral portion 28 and rest against the curved side of the drinking vessel 34.

The brewing basket 24 may be moved to the deployed position and positioned within the drinking vessel 34 to expose brewing product in the brewing basket 24 to liquid in the drinking vessel 34, as shown in FIG. 13. When the liquid is sufficiently exposed to the brewing product to a make a brewed product desired by the user, the user may grasp the gripping tab 40 and pull upward on the attachment member 22 up to move the brewing basket 24 into the stowed position shown in FIG. 12, preventing the brewed product from becoming oversaturated and bitter. The user may easily perform such an operation with one hand while performing other tasks.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare statement of "two recitations," without other modifiers, typically means at least two recitations, or two or more recitations).

What is claimed is:

1. An integrated beverage infuser and lid for use with a single-serving drinking vessel, comprising:
   a main body having an upper portion and a lower portion, the lower portion being configured for removable attachment to the single-serving drinking vessel, the upper portion having a drink recess with a base portion having an upper side and a lower side, and a first sidewall portion projecting upwardly above the upper side of the base portion with an upper end portion having a laterally extending sidewall recess with an upper opening that opens upward, the base portion having a first attachment aperture and a drinking aperture, each extending fully through the base portion between the upper side and the lower side of the base portion, the first attachment aperture having a fixed size;
   a fluid-permeable brewing basket having a rigid upper end wall, a rigid lower end wall, and a rigid basket sidewall enclosing a space between the upper end wall and the lower end wall to define an enclosable receptacle for removable receipt of a consumable brewing product, the lower end wall being moveable between an open position for receipt of the consumable brewing product within the receptacle when the lid is removed from the single-serving drinking vessel and a closed position for retaining the consumable brewing product within the receptacle when the lid is attached to the single-serving drinking vessel and the brewing basket is in the deployed position;
   a flexible attachment member extending through the first attachment aperture and having an upper end portion located above the upper side of the base portion and a lower end portion located below the lower side of the base portion and attached to the brewing basket, the attachment member being operable to move the brewing basket between a stowed position wherein the upper end wall is proximate to the lower side of the base portion, and a deployed position wherein the upper end wall is spaced apart from the lower side of the base portion, the attachment member being attached to the brewing basket so as to support the brewing basket with the upper end wall above the lower end wall when in the deployed position, the sidewall recess being sized to releasably retain at least a lengthwise portion of the upper portion of the attachment member therewithin against inward movement when the brewing basket is in the stowed position.

2. The integrated beverage infuser and lid of claim 1, wherein the sidewall recess has an outer end portion and the upper end portion of the attachment member includes a gripping member for gripping by a user, at least a lengthwise portion of the attachment member is stretchable, and the attachment member is sized in length such that when the brewing basket is moved to the stowed position, the gripping member must be pulled to stretch the stretchable lengthwise portion of the attachment member to position the attachment member within the sidewall recess with the gripping member laterally outward of the outer end portion of the sidewall recess, the gripping member having a size sufficiently larger than the outer end portion of the sidewall recess that an inward force resulting from the stretched attachment member does not pull the gripping member inward through the sidewall recess.

3. The integrated beverage infuser and lid of claim 1, wherein the first attachment aperture extends through the base portion at a central location of the upper portion.

4. The integrated beverage infuser and lid of claim 1, wherein the attachment member has a lengthwise mid-portion which extends through the first attachment aperture as the brewing basket is moved between the deployed and the stowed positions, the first attachment aperture and the lengthwise mid-portion of the attachment member having substantially the same cross-sectional size and shape.

5. The integrated beverage infuser and lid of claim 1, wherein the upper portion of the main body further includes a second sidewall portion projecting upwardly above the upper side of the base portion, the first and second sidewall portions being space apart and together with the base portion defining a recess therebetween, the first attachment aperture and the drinking aperture being separate spaced-apart apertures, each with an upper end located within the recess.

6. The integrated beverage infuser and lid of claim 1, wherein the sidewall recess has spaced first and second opposing walls spaced close enough together to grip therebetween the at least lengthwise portion of the attachment member positioned therewithin and retain the upper portion of the attachment member against inward movement when the brewing basket is in the stowed position, the at least lengthwise portion of the attachment member being movable in a transverse direction relative to the at least lengthwise portion of the attachment member for movement into and out of the upper opening of the sidewall recess.

7. The integrated beverage infuser and lid of claim 1, wherein the main body includes a cover pivotally connected to the upper portion for rotation about an axis of rotation, the cover being selectively movable between an open position wherein the drinking aperture is unsealed and exposed for drinking and a closed position wherein the drinking aperture is sealed.

8. The integrated beverage infuser and lid of claim 7, wherein the cover fits into the first elongated recess when in the closed position.

9. The integrated beverage infuser and lid of claim 7, wherein an enclosed space is defined between the first elongated recess and the cover in the closed position, the cover including a drinking stopper adapted to seal the drinking aperture when in the closed position.

10. The integrated beverage infuser and lid of claim 7, wherein an enclosed space is defined between the first elongated recess and the cover in the closed position, the cover including a venting stopper adapted to seal the venting aperture when in the closed position.

11. The integrated beverage infuser and lid of claim 7, wherein the axis of rotation is disposed at a location adjacent to a periphery of the upper portion.

12. The integrated beverage infuser and lid of claim 1, wherein the attachment member has a middle lengthwise portion located between the upper end portion and the lower end portion, the middle lengthwise portion being slidably movable through the first attachment aperture.

13. The integrated beverage infuser and lid of claim 1, wherein the brewing basket includes a second attachment aperture in the upper end wall for receiving and retaining the attachment member.

14. The integrated beverage infuser and lid of claim 12, wherein the upper end portion includes a gripping tab to facilitate gripping and sliding the attachment member through the first attachment aperture.

15. The integrated beverage infuser and lid of claim 12, wherein the upper end portion includes a first base portion sized to prevent withdrawal of the upper end portion downward through the first attachment aperture.

16. The integrated beverage infuser and lid of claim 15, wherein the first base portion abuts an outer surface of the first sidewall portion when the middle portion is retained in the sidewall recess.

17. The integrated beverage infuser and lid of claim 15, wherein the first base portion abuts the first attachment aperture when the brewing basket is in the deployed position.

18. The integrated beverage infuser and lid of claim 12, wherein the main body includes a cover pivotally connected to the upper portion for rotation about an axis of rotation, the cover being selectively movable between an open position wherein the drinking aperture is unsealed and exposed for drinking and a closed position wherein the drinking aperture is sealed, wherein when the cover is in the closed position an enclosed space is defined between the cover and the upper portion of the main body, and when the cover is in the closed position and the brewing basket is in the deployed position, the upper end portion of the attachment member is positioned within the enclosed space.

19. The integrated beverage infuser and lid of claim 12, wherein the main body includes a cover pivotally connected to the upper portion for rotation about an axis of rotation, the cover being selectively movable between an open position wherein the drinking aperture is unsealed and exposed for drinking and a closed position wherein the drinking aperture is sealed, wherein when the cover is in the closed position an enclosed space is defined between the cover and the upper portion of the main body, and when the cover is in the closed position and the brewing basket is in the stowed position, the upper end portion of the attachment member is positioned outside the enclosed space.

20. The integrated beverage infuser and lid of claim 12, wherein the middle lengthwise portion has a substantially same diameter as the first attachment aperture.

21. The integrated beverage infuser and lid of claim 12, wherein the upper end wall has a second attachment aperture and the lower end portion includes a second base portion sized to prevent full withdrawal of the lower end portion upward through the second attachment aperture.

22. The integrated beverage infuser and lid of claim 21, wherein the second base portion abuts the first attachment aperture when the brewing basket is in the stowed position.

23. The integrated beverage infuser and lid of claim 1, wherein the sidewall recess has an engagement portion and the upper end portion of the attachment member includes a stop member, at least a lengthwise portion of the attachment member is stretchable, and the attachment member is sized in length such that when the brewing basket is moved to the stowed position, the stretchable lengthwise portion of the attachment member is sufficiently stretchable to position the attachment member within the sidewall recess with the stop member laterally outward of the engagement portion of the sidewall recess, the stop member having a size sufficiently larger than the engagement portion of the sidewall recess that an inward force resulting from the stretched attachment member does not pull the gripping member inward through the sidewall recess.

24. The integrated beverage infuser and lid of claim 1, wherein the upper end portion of the attachment member includes a stop member, the stop member having a size sufficiently larger than at least a portion of the first attachment aperture that the stop member will not pass downward through the first attachment aperture when the brewing basket is in the deployed position.

25. The integrated beverage infuser and lid of claim 1, wherein the main body further includes a venting aperture for equalizing pressure within the drinking vessel with ambient pressure when liquid is removed through the drinking aperture.

26. The integrated beverage infuser and lid of claim 1, wherein the lower portion of the main body is threadably connectable to the single-serving drinking vessel.

27. The integrated beverage infuser and lid of claim 1, wherein the brewing basket includes a plurality of holes.

28. The integrated beverage infuser and lid of claim 1, wherein the brewing basket includes a door for selectively inserting and retaining the consumable brewing product therein.

29. An integrated beverage infuser and lid for use with a drinking vessel, comprising:
  a main body having an upper portion provided with a drinking aperture;
  a fluid-permeable brewing basket having an upper end wall, a lower end wall, and a basket sidewall enclosing a space between the upper end wall and the lower end wall to define an enclosable receptacle for removable receipt of a consumable brewing product; and a flexible attachment member operable to move the brewing basket between a stowed position wherein the upper end wall is proximate to the upper portion of the lid, and a deployed position wherein the upper end wall is spaced apart from the upper portion of the lid, the attachment member being attached to the brewing basket so as to support the brewing basket with the upper end wall above the lower end wall when in the deployed position, wherein the main body further includes a sidewall recess in the upper portion that opens upward and is sized to releasably retain the attachment member when the brewing basket is in the stowed position, and wherein the sidewall recess has an upper opening portion tapering downward to a narrower receiving portion sized to receive and retain the attachment member therein when the brewing basket is in the stowed position.

30. A single serving drinking container assembly, comprising:
a single serving drinking vessel; and
an integrated beverage infuser and lid for use with a drinking vessel, including
a main body having an upper portion provided with a drinking aperture and a downwardly opening cavity;
a fluid-permeable brewing basket having an upper end, a lower end wall, and a basket sidewall enclosing a space between the upper end wall and the lower end wall to define an enclosable receptacle for removable receipt of a consumable brewing product; and
a flexible attachment member operable to move the brewing basket between a stowed position wherein the upper end wall is positioned within the cavity, and a deployed position wherein the upper end wall is positioned outside of the cavity, the attachment member being attached to the brewing basket so as to support the brewing basket with the upper end wall within the cavity above the lower end wall when in the deployed position, wherein the main body further includes a sidewall recess in the upper portion that opens upward and is sized to releasably retain the attachment member when the brewing basket is in the stowed position, and wherein the sidewall recess has an upper opening portion tapering downward to a narrower receiving portion sized to receive and retain the attachment member therein when the brewing basket is in the stowed position.

31. The drinking container assembly of claim 30 wherein the main body has an attachment aperture extending from the upper portion to the downwardly opening cavity, the flexible attachment member extending through the attachment aperture and having a lower end portion attached to the upper end of the brewing basket and an upper end portion extendable above the upper portion.

* * * * *